(12) United States Patent
Haran et al.

(10) Patent No.: US 11,799,363 B2
(45) Date of Patent: Oct. 24, 2023

(54) SLOTLESS ELECTRIC MOTOR HAVING IMPROVED TRANSIENT CAPABILITY

(71) Applicant: Hinetics LLC, Champaign, IL (US)

(72) Inventors: Kiruba S. Haran, Champaign, IL (US); Xuan Yi, Champaign, IL (US); Yangxue Yu, Brookfield, WI (US)

(73) Assignee: Hinetics LLC, Champaign, IL (US)

( * ) Notice: Subject to any disclaimer, the term of this patent is extended or adjusted under 35 U.S.C. 154(b) by 416 days.

(21) Appl. No.: 17/094,083

(22) Filed: Nov. 10, 2020

(65) Prior Publication Data

US 2021/0152052 A1 May 20, 2021

Related U.S. Application Data

(60) Provisional application No. 62/935,287, filed on Nov. 14, 2019.

(51) Int. Cl.
| | |
|---|---|
| *H02K 9/20* | (2006.01) |
| *H02K 9/22* | (2006.01) |
| *B64D 27/24* | (2006.01) |
| *H02K 21/22* | (2006.01) |
| *H02P 29/64* | (2016.01) |

(52) U.S. Cl.
CPC ............ *H02K 9/20* (2013.01); *B64D 27/24* (2013.01); *H02K 9/225* (2021.01); *H02K 9/227* (2021.01); *H02K 21/22* (2013.01); *H02P 29/64* (2016.02)

(58) Field of Classification Search
CPC . B64D 27/24; H02K 9/20; H02K 9/22; H02K 9/225; H02K 9/227; H02K 21/22; H02P 29/64
USPC .................. 310/52, 54, 58, 64, 216.002
See application file for complete search history.

(56) References Cited

U.S. PATENT DOCUMENTS

| | | |
|---|---|---|
| 5,140,204 A | 8/1992 | Cashmore et al. |
| 7,069,979 B2 | 7/2006 | Tobias |
| 2019/0379257 A1* | 12/2019 | Gerstler .................... F01D 9/02 |
| 2021/0288531 A1* | 9/2021 | Takahashi ................ H02K 3/28 |
| 2021/0367465 A1* | 11/2021 | Takahashi ............. H02K 1/278 |
| 2022/0006339 A1* | 1/2022 | Takahashi ........... H02K 13/006 |
| 2022/0302816 A1* | 9/2022 | Xiao ....................... H02K 3/47 |
| 2022/0360129 A1* | 11/2022 | Salk ....................... H02K 9/227 |

* cited by examiner

*Primary Examiner* — Rashad H Johnson
(74) *Attorney, Agent, or Firm* — Boyle Fredrickson, S.C.

(57) ABSTRACT

A slotless electric motor provides a phase change material that may communicate thermally through the sides of coils directly attached to the outer circumference of the central stator. A control system modeling the motor allows effective operation for short durations.

7 Claims, 3 Drawing Sheets

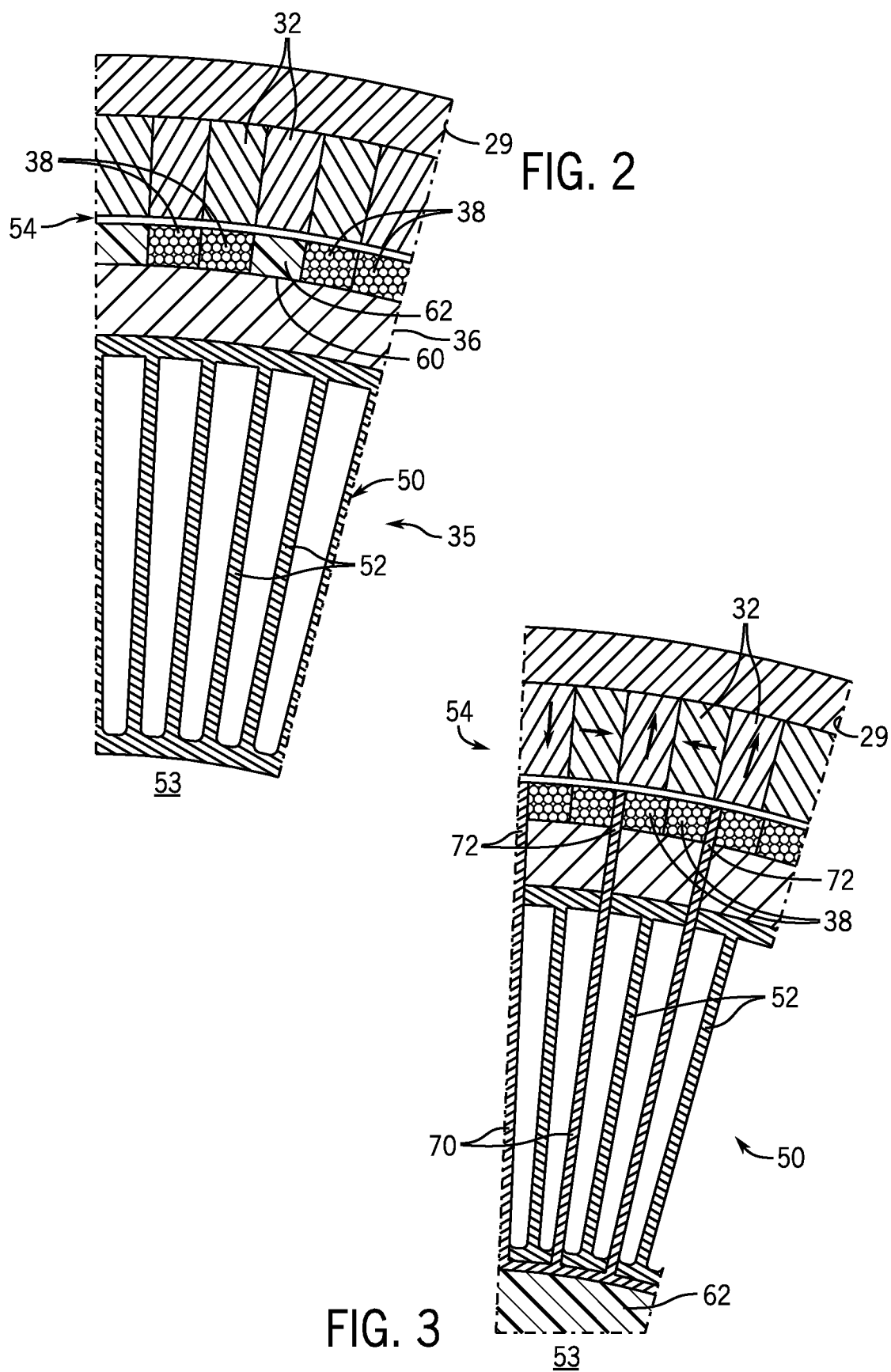

SLOTLESS ELECTRIC MOTOR HAVING IMPROVED TRANSIENT CAPABILITY

CROSS REFERENCE TO RELATED APPLICATION

This application claims the benefit of U.S. provisional application 62/935,287 filed Nov. 14, 2019, and hereby incorporated by reference.

FIELD OF THE INVENTION

The present invention relates to electrical machines and in particular to an electric motor having improved transient load capabilities.

BACKGROUND OF THE INVENTION

Many emerging electric transportation applications have a widely varying power requirement depending on the 'drive cycle' (in road vehicles) or how the electric drive in an electric or hybrid-electric propulsion system is employed within a flight mission (in aircraft). Some of the transportation applications also have stringent requirements on the size and weight of the electric motors. This is because with many systems/units inside the aircraft, the larger the motor is, the less the room is reserved for cargo, and the heavier the motor weight, the more the power is generated to lift itself. Thus, designing motors capable of meeting the peak power requirements on a continuous basis may not be the ideal solution because peak power is only required during a short period of the mission. The short-term, transient capability of the motor must be utilized to minimize size and weight.

The power capability of electric motors depends on, among other things, the electrical loading of the machine, i.e., how much current is fed into the motor (or drawn from a generator). The limit on the amount of current within a machine is primarily thermal. Other limits relating to demagnetization (in the case of PM machines), electromagnetic forces, etc. are typically at much higher levels than the thermal constraint. Recognizing this, the heat capacity of the mass of the motor can enable higher current loadings, and consequently higher power, for short periods of time as the motor temperature builds up gradually. A detailed electro-thermal model of the motor, and a control scheme that incorporates this may take advantage of the extra capability in an effective manner. A significant trade-off emerges for applications where the size and weight are critical. As motor power density is increased, the mass of active material employed to generate a given amount of power or torque is reduced, thereby reducing the heat capacity and hence the short term 'overload' capability.

An improved thermal capacity with reduced motor mass can be obtained by using a phase change material (PCM), a category of material that stores/dissipates a large amount of energy during the phase change process. In recent years, solid-liquid PCMs have been considered for the thermal capacity of electrical motors; however practical commercial implementation remains difficult.

SUMMARY OF THE INVENTION

The present invention provides an electrical motor with high power density and high thermal mass by providing cooling of motor coils with a phase change material (PCM) conducting heat through the coil sidewalls. This approach provides a number of benefits including a simplified, practical manufacturing of slotless motors and the ability to conveniently locate the PCM.

Specifically, the present invention provides in one embodiment a slotless electric machine having a rotor mounted for rotation about an axis and a stator positioned movably adjacent to the rotor and providing a ferrous stator body having a circumferential periphery. The periphery supports a series of electrically independent coils spaced therealong. The coils provide a first face facing the rotor and separated by coil sidewalls from a second face attached to the circumferential periphery. A phase change material is supported by the stator and in thermal communication through at least one sidewall of each coil with the coil.

It is thus a feature of at least one embodiment of the invention to provide simplified manufacturer of a high power density, high thermal mass motor by providing lateral thermal communication with the motor coils and the PCM.

It is another feature of at least one embodiment of the invention to minimize motor dimensions by placing the PCMn otherwise unused volume of a stationary center stator.

The coils may be attached to the ferrous stator body without intervening phase change material.

It is thus a feature of at least one embodiment of the invention to greatly simplify manufacture and robustness of the motor by allowing the coils to be directly attached to the ferrous support.

The phase change material may be held in a chamber position between sidewalls of the coils and attached to the circumferential periphery.

It is thus a feature of at least one embodiment of the invention to provide a method of isolating the phase change material to reduce its possible chemical reaction with the material of the coils while providing good thermal communication.

The chamber may be substantially electrically nonconducting.

It is thus a feature one embodiment of the invention to reduce the possibility of electrical shorting or eddy current heating.

The chamber may have a radial extent substantially equal to a radial extent between the first and second faces of the coils.

It is thus a feature of at least one embodiment of the invention to simplify manufacturing by providing phase change material containers that can easily be integrated with the coils on the stator.

In one embodiment, the phase change material may be held beneath the circumferential periphery and communicates by a heat conductor to a position between sidewalls of adjacent coils.

It is thus a feature of at least one embodiment of the invention to maximize coil area that would otherwise be displaced by PCM.

The phase change material may be positioned beneath the circumferential periphery separated from the circumferential periphery by a nonferrous heatsink having air passages therethrough.

It is thus a feature of at least one embodiment of the invention to move the PCM to a far side of the heatsink for improved heatsink utilization and improved positioning of the heatsink.

The phase change material may be in thermal communication with the coils through sidewalls of only every other pair of adjacent sidewalls.

It is thus a feature of at least one embodiment of the invention to provide an improved trade-off between thermal conduction to the PCM and displacement of coils from the periphery.

The slotless electric machine may include a motor drive unit providing electrical power to the electrically independent coils and executing a program to: (1) monitor the energy consumption of the motor; (2) model the coil temperature as moderated by the phase change material; and (3) provide an output indicating at least one of: (i) remaining thermal capacity of the phase change material being proportional to amount of phase change material that has not changed in phase and (ii) an estimated time of exhaustion of the thermal capacity.

It is thus a feature of at least one embodiment of the invention to allow improved optimization of the amount of PCM for a particular application by allowing real time monitoring of thermal reserve and anticipation of thermal reserve exhaustion.

In one embodiment the electric machine may be used in an aircraft providing one or more engines each including a fan having a driveshaft communicating with a first and second different prime mover, the second prime mover being the slotless electric machine described above.

It is thus a feature of at least one embodiment of the invention to provide a motor well suited for aircraft use having compact size and high power density.

These particular objects and advantages may apply to only some embodiments falling within the claims and thus do not define the scope of the invention.

BRIEF DESCRIPTION OF THE FIGURES

FIG. 2 is a fragmentary cross-section of a first embodiment of the invention providing phase change material in compartments placed between motor coils;

FIG. 3 is a fragmentary cross-section similar to that of FIG. 2 showing the use of heat pipes to communicate between the coils and centrally located phase change material.

DETAILED DESCRIPTION OF THE PREFERRED EMBODIMENTS

Figure 1:
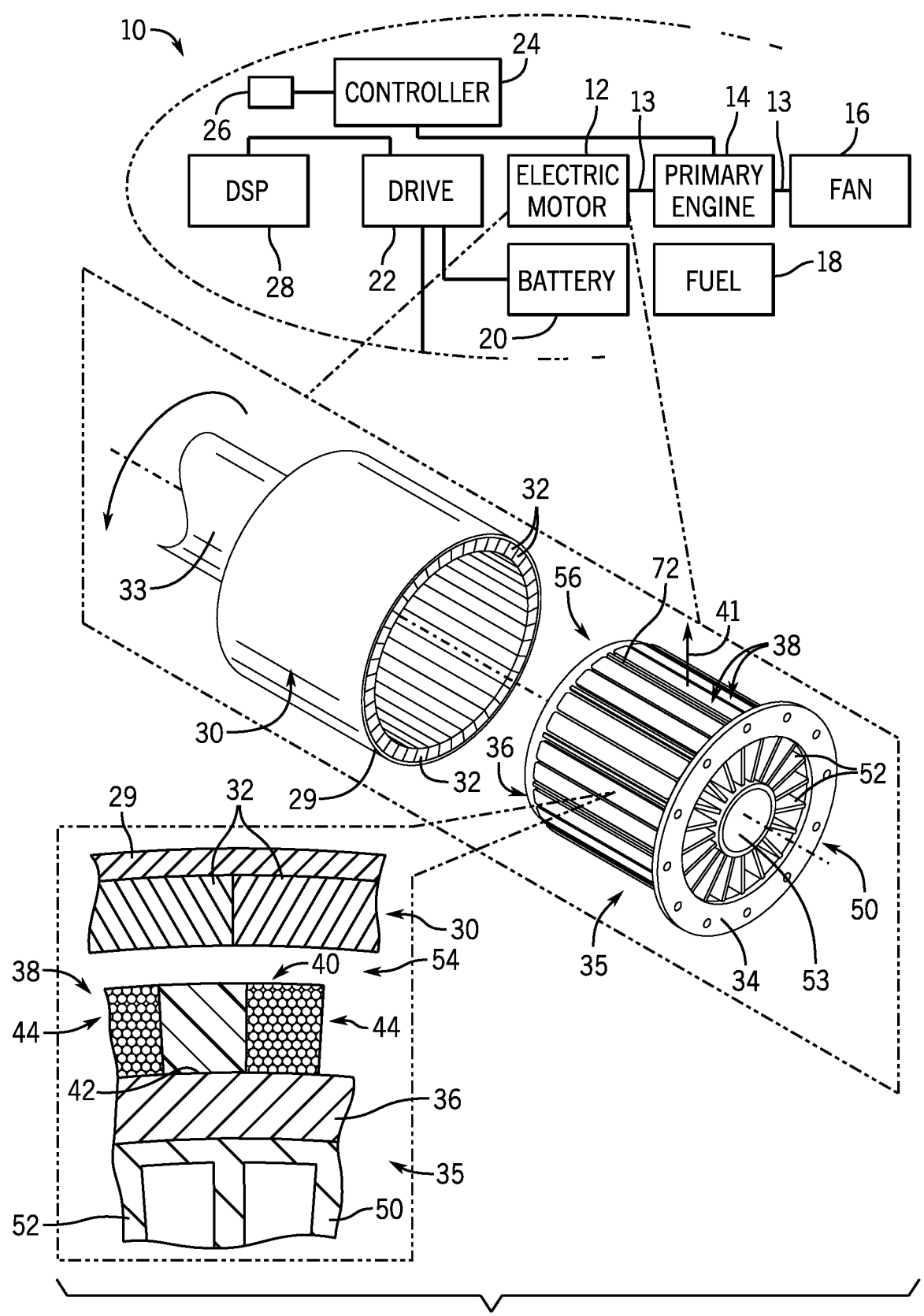
FIG. 1 is a simplified block diagram of an airplane employing the electric motor of the present invention and providing expanded views of the basic motor structure and coil assembly of that motor structure.

Referring now to FIG. 1 the present invention may be incorporated into the aircraft 10 having different prime movers of an electric motor 12 operating in conjunction with a fuel-burning primary engine 14 such as a gas turbine or the like. Together or individually the electric motor 12 and the primary engine 14 may drive a fan 16 such as a turbo fan, propeller, or the like.

During most of the flight of the aircraft 10, power may be provided by the primary engine 14 consuming hydrocarbon fuel 18. The electric motor 12 will typically be used episodically, for example, during power-demanding takeoff of the aircraft, drawing power during these times from a set of batteries 20 which may be recharged during the remainder of the flight by a generator set (not shown) associated with the primary engine 14. In a direct drive design as shown, a common driveshaft 13 may communicate between the electric motor 12, the primary engine 14, and the fan 16; however, the invention also contemplates interconnecting drive systems having intervening clutches and gearboxes.

The electric motor 12 may be associated with a motor drive 22, for example, a solid-state drive processing power from the batteries 20 to provide the necessary voltages and phases for multiple motor windings, the latter as will be described. The motor drive 22 may communicate with an aircraft controller 24 serving to coordinate operation of the electric motor 12 and primary engine 14 according to command signals (throttle etc.) received by flight controls 26 from the pilot or an autopilot or the like. The motor drive 22 may provide for information to the aircraft controller 24 for the purpose of coordinating the operation of the electric motor 12 and primary engine 14 and may provide display information in a cockpit display 28 as will be discussed further below.

Referring still to FIG. 1, the electric motor 12 in a preferred embodiment may be a slotless-winding, outer-rotor, air-cooled permanent magnet synchronous motor (PMSM) having an external rotor 30 rotatably mounted on bearings (not shown) to turn a driveshaft 33 that may provide mechanical power to the fan 16. The rotor 30 may provide a generally cylindrical tubular shell 29 having permanent magnets 32 lining its interior surface, for example, including magnets having a radial orientation of their north-south axes, for example, in parts of a Halbach array, the latter configuration eliminating the need for ferrous material in the rotor 30. The tubular shell 29 may, for example, be a non-magnetic material that has low density and high strength (e.g., titanium) that may continue to the unitary drive shaft 33 supported by bearings (not shown) as well as provide a container for the permanent magnets 32 against the centrifugal forces.

Fitting within the rotor 30 is a stationary stator 35, for example, having a flange 34 for mounting it to a fixed structure of the aircraft 10. The stator 35 may include cylindrical support structure 36 holding on its outer periphery an angularly spaced array of coils 38. Each coil is constructed of multiple turns of an electrical conductor such as copper about radial axes to provide a radially-oriented magnetic field 41 with current flow through the coils 38.

Generally, each coil 38 will have an outer face 40 passing closely adjacent to the inner surface of the magnets 32 and an inner face 42 that may be attached directly, for example, by epoxy or the like, to the support structure 36. The outer face 40 is separated from the inner face 42 by radially-extending sidewalls 44 which may be adjacent to other coils 38 or structures associated with communicating with phase change material as will be discussed below. The conductive windings of the coils 38 may be potted in a stabilizing material such as a thermoplastic resin.

The coils 38 are arranged around the circumference of the support structure 36 without intervening ferromagnetic material eliminating the need for stator lamination slots or teeth. Magnetic flux radially inward from the inner face 42 of the coils 38 is conducted by the high-permeability, low-loss material of the support structure 36, for example, being thin layers of silicon steel and cobalt alloy laminated to reduce eddy current losses.

The stator support structure 36 may be tubular and fitted around a heatsink assembly 50 having multiple radial fins 52 allowing dissipation of heat conducted from the coils 38 through the stator support structure 36 into the heatsink assembly 50 to pass in turn to air moving axially along the fins 52 under the influence of a contained fan (not shown). Each of the fins 52 may extend radially from a central cylindrical chamber 53, the latter as will be discussed in further detail below. The heatsink assembly 50 is preferably a lightweight non-ferromagnetic material such as aluminum.

During operation of the electric motor 12, there are four inherent mechanisms for dissipating the heat from the coils 38 including: by conduction through the stator support structure 36 to the heatsink assembly 50 and then through fins 52 to the air, conduction from the outer face 40 of the coils 38 into the air gap 54 between the coils 38 and the inner surface of the magnets 32, absorption into the material of the mass of the stator support structure 36, and into the air from the axial ends 56 of the coils 38. The present invention provides an additional mechanism of heating phase change material as will now be described.

First Embodiment

Referring now also to FIG. 2, for moderate transient heat capacity requirement, tubes 60 filled with PCM 62 may be placed between alternate pair of coils 38. In one embodiment, the tube 60 may have substantially the same outer dimension as an individual coil 38 and so may simply replace a coil 38 during manufacturing without altering coil dimensions of an existing motor design. By placing the tubes 60 in this manner, each coil 38 has direct contact to a tube 60 through a sidewall 44. The PCM 62 is material having a substantial energy of phase change and desirably a phase change temperature above the steady state temperature of the coils 38 and below the ultimate temperature limit of the coils 38 or other temperature sensitive structure. In one embodiment, the PCM may be a solid material changing to a liquid phase at a temperature above 50° C. and may, for example, be a paraffin, eutectic salt, metal alloy, or other materials well known in the art.

The tubes 60 are desirably constructed of a non-electrically conducting material (ceramic or thin plastic) or high electrical resistivity metals (e.g., Inconel, titanium, etc.). The tube 60 may include internal fins, honeycomb, or other similar structures of highly thermally conductive material to improve the heat transfer between the walls of the tubes 60 and the internal PCM 62.

The tubes 60 can be assembled into a standard motor construction with very little modification by simply inserting the PCM-filled tubes 60 between the coils 38 at the time of attachment of the coils 38 to the stator support structure 36 using the same attachment mechanism of epoxy or the like to attach the tube 60. The tubes 60 may be sealed to hold the PCM 62 therein and may include internal bellows or other similar mechanisms to accommodate expansion of the PCM without leakage. The cross-section of the tube 60 may be generally rectangular or may be keystoned so that its sidewalls 44 extend along radial lines for improved space efficiency.

The motor drive 22 will be reprogrammed to accommodate the irregular spacing of the coils 38 so as to provide an approximation of a continuously rotating magnetic vector of a standard electrical motor by staggering the phasing of the coils appropriately.

When the electric motor 12 starts running at a higher-than-rated current, the PCM 62 phase changes from solid to liquid absorbing a large amount of heat in the heat of fusion and acting like a like a thermal capacitance. Thus, more time is reserved to run at overload condition within the motor temperature limit. It will be appreciated that the PCM may also exploit the phase change between liquid and gas and the heat of evaporation.

Second Embodiment

Referring now to FIGS. 1 and 3, for increase in the transient heat capacity, radially extending heat pipes 70 may be arranged between the coils 38 and central chamber 53, the latter which may now provide a reservoir for phase change material 62. The heat pipes 70 may be arranged to extend outwardly to positions between every other pair of coils 38. The radially outward end of each heat pipe 70 communicates with a heat spreader 72 of highly conductive material 72 (for example, as shown in FIG. 1) and may spread the heat along the sidewalls 44 of the adjacent coils 38. The heat spreader may, for example, be a material that is nonferromagnetic such as aluminum.

Like the tubes 60 in the first embodiment, these heat pipes 70 and heat spreaders 72 provide direct thermal communication with the sidewalls 44 of each coil 38 to conduct heat to the phase change material 62. It will be appreciated that these heat pipes 70 may be relatively compact and thus may be threaded through holes or slots in the heatsink assembly 50 and stator support structure 36. The heat pipes 70 may be solid conductive material but are desirably tubes having a material conducting heat by a combination of thermal conductivity, phase transition, and material movement as is generally understood in the art.

Figure 4:
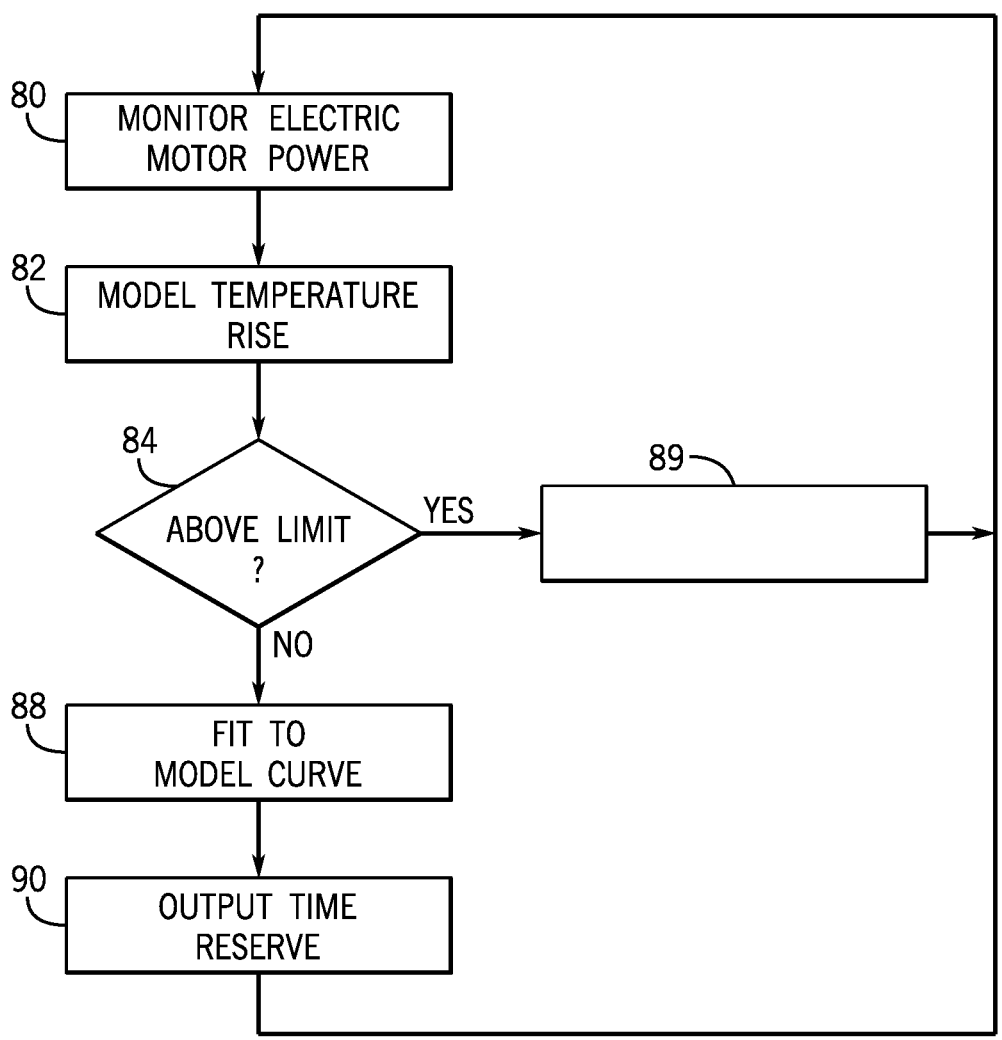
FIG. 4 is a flowchart of a program executed by the motor drive of FIG. 1 for providing information about the thermal capacity of the motor.

Referring now to FIGS. 1 and 4, the drive 22 may monitor the electrical power consumed by the electrical motor 12 as indicated by process block 80, for example, using standard data acquisition circuits, current sensors, and voltage sensors, and may provide regular sampling through the use of an internal microcontroller or the like which may implement these steps. As indicated by process block 82, this sampled information may be provided to a model empirically developed that relates historical power consumption with temperature rise of material of the coils 38, the magnets 32, and/or other possibly temperature sensitive structures (adhesives and the like). Generally this model will provide for a time integration of power being deposited in the motor 12 moderated by resistive paths of heat flow out of the motor as discussed above and may consider measured ambient temperature, operating speed of the motor, and associated airflow therethrough.

At decision block 84, the modeled temperature is compared to a predetermined absolute temperature limit representing a safety-reduced factor of failure limits for the temperature sensitive components, for example, a temperature of 100° C. If at decision block 84 this temperature limit has been reached, the program will proceed to process block 89 and provide a warning through display 28 and/or a throttling down of the motor 12 by reducing its power.

If the thermal limit has not been reached per decision block 84 at process block 88, the current temperature trajectory constructed from the samples obtained at process block 80 is fit to empirically derived curves projecting temperature rise with continued current power consumption (or modeled future power consumption when standard motor loads are applied) to determine a future trajectory of temperature rise within the electric motor 12. This trajectory is analyzed at process block 92 to determine a time until the absolute limit of decision block 84 will be exceeded which may be provided to the display 28 to inform the pilot or the like of how much margin there is left in the thermal capacity of the electric motor 12.

While the invention has been described in the context of aircraft propulsion it will be appreciated that it has broad use for any application where short periods of high power output are required of the motor. Further, in the aviation application, it will be appreciated that the present invention can be used as the sole prime mover without the primary engine 14 accommodating both normal power requirements during flight and episodic high-power requirements during takeoff.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A slotless electric machine comprising:
a rotor mounted for rotation about an axis;
a stator positioned adjacent to the rotor and providing a ferrous stator body having a circumferential periphery supporting a series of electrically independent coils spaced there along, the coils providing a first face facing the rotor and separated by sidewalls from a second face attached to the circumferential periphery; and
a phase change material supported by the stator and in thermal communication through at least one sidewall of each coil with the coil
wherein the phase change material is held within the stator and displaced from the circumferential periphery and communicates by a heat conductor to a position between sidewalls of adjacent coils.

2. The slotless electric machine of claim 1 wherein the coils attach to the ferrous stator body without intervening phase change material.

3. The slotless electric machine of claim 1 wherein the phase change material is separated from the circumferential periphery by a nonferrous heatsink having air passages therethrough.

4. The slotless electric machine of claim 1 wherein the phase change material is in thermal communication with the coils through sidewalls of only every other pair of adjacent sidewalls.

5. The slotless electric machine of claim 1 further including a motor drive unit providing electrical power to the electrically independent windings and including an electronic computer executing a program contained in non-transitory media to:
(1) monitor the operation of the motor;
(2) model the temperature of the coils as moderated by the phase change material; and
(3) provide an output indicating at least one of:
(i) remaining thermal capacity of the phase change material being proportional to the amount of phase change material that has not changed in phase; and
(ii) an estimated time of exhaustion of the thermal capacity.

6. The slotless electric machine of claim 1 wherein the stator is positioned coaxially within the rotor.

7. An aircraft having one or more engines each including a fan having a driveshaft communicating with a slotless electric machine comprising: a rotor mounted for rotation about an axis; a stator positioned adjacent to the rotor and providing a ferrous stator body having a circumferential periphery supporting a series of electrically independent coils spaced there-along the coils providing a first face facing the rotor and separated by sidewalls from a second face attached to the circumferential periphery; and a phase change material supported by the stator and in thermal communication through at least one sidewall of each coil with the coil; wherein the phase change material is held within the stator and displaced from the circumferential periphery and communicates by a heat conductor to a position between sidewalls of adjacent coils.

* * * * *